March 30, 1948.  O. H. SCHUCK  2,438,580

COMPENSATOR FOR DOPPLER EFFECT

Filed Nov. 6, 1943

INVENTOR
OSCAR HUGO SCHUCK
BY
ATTORNEY

Patented Mar. 30, 1948

2,438,580

UNITED STATES PATENT OFFICE 2,438,580

COMPENSATOR FOR DOPPLER EFFECT

Oscar Hugo Schuck, Belmont, Mass., assignor to the United States of America as represented by the Secretary of the Navy Application November 6, 1943, Serial No. 509,300

5 Claims. (Cl. 177—386)

This invention relates to the compensation for Doppler effect due to motion of the searching ship in connection with echo ranging apparatus, and more particularly to a device used as an auxiliary to standard sound gear to accomplish the compensation of the Doppler effect due to the motion of the searching ship.

If a source of sound, or any compressional wave, is in motion toward an observer, or the observer in motion toward it, more waves are received per second by the observer than are sent out by the source. If the wave from the source travels a distance in one second equal to its velocity $c$, and the observer moves toward it in one second a distance equal to his velocity $v$, the observer will in one second receive the number of waves $f$ which he should have received at rest, plus the number he has overtaken by his speed, which will be the number of times the wavelength $\lambda$ goes into his velocity.

The frequency $f$, received by the observer is $f + v/\lambda$. But $1/\lambda = f/c$, and $\lambda = c/f$. Substituting for $\lambda$, we have $f_1 = f + vf/c$. The change in apparent frequency due to the observer's motion is $fv/c$. An equal change in the opposite direction occurs if the observer recedes from the source. The law of change of frequency due to motion is known as Doppler's principle. And this invention is concerned with the development of an auxiliary device to be used with standard sound gear to compensate the radiated frequency of the projected beam for the Doppler effect. This compensation is necessary for optimum action of the receiver, which is designed for the best operation at one particular frequency.

Briefly, this invention consists of so controlling the capacity of the frequency generating or receiving means so as to shift the frequency an amount required to balance or compensate that change of frequency introduced by the Doppler effect.

An object of this invention is the development of an apparatus to compensate for the change of frequency introduced into sound gear equipment by the Doppler effect.

An object of this invention is the development of an apparatus to compensate for the change of frequency introduced into sound gear equipment due to its own motion, such as the speed of the ship upon which it is installed.

An object of this invention is the development of an apparatus which modifies a capacity in the sound gear equipment in accordance with the magnitude and direction of the velocity of the ship in which the sound gear is installed in order to compensate the frequency output of the sound gear for the Doppler effect introduced by the ship's speed.

Another object is the provision of a compensating device which will be economical to manufacture, reliable in operation and which possesses all of the qualities of ruggedness and dependability in service.

Other objects and features will become apparent upon a careful consideration of the following detailed description when taken together with the accompanying drawings, the figures of which are designed for the sole purpose of illustration and not as a definition of the limits of the invention, reference for the latter purpose being had to the appended claims.

Figure 1:
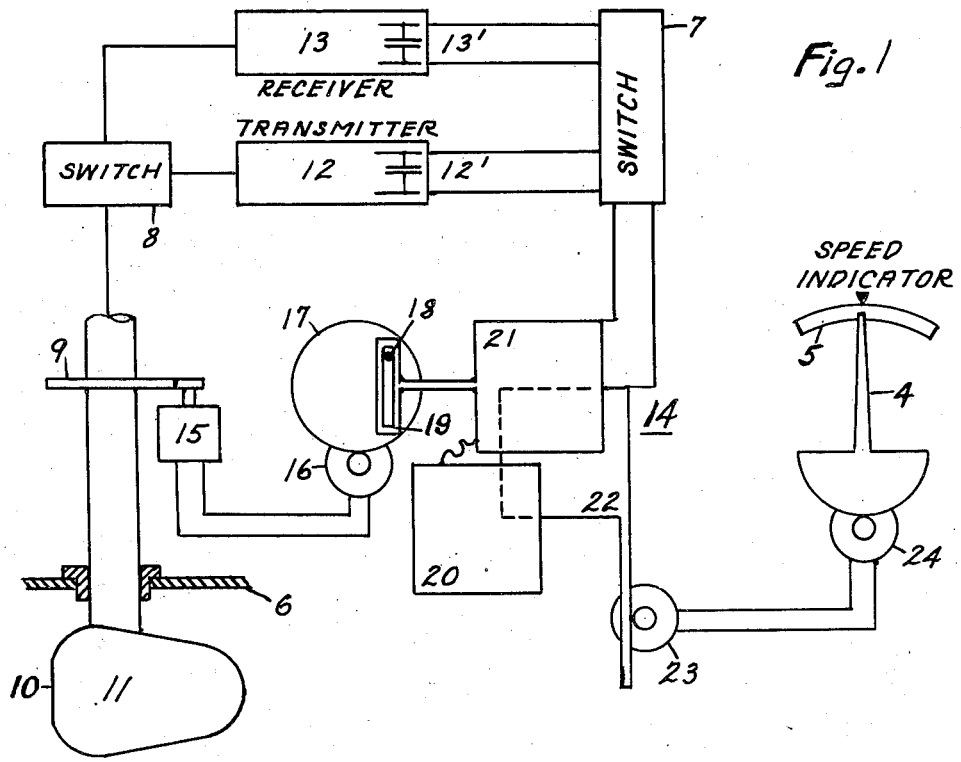
Figure 1 illustrates one form of this invention utilizing mechanical means.

Before proceeding with a detailed description of the various embodiments of my invention certain remarks having general application to my novel invention will first be made with a view to avoiding needless repetition in subsequent parts of the specification and for the purpose of insuring clarity of exposition.

To set forth the mathematical basis of this invention; let $f$ be the actual frequency of the sound generated on the searching ship; let $v$ be the speed of the ship; let $\phi$ be the angle between the target upon which the transducer is trained and the course of the searching ship, often called the sight angle; and let $c$ be the velocity of sound in water. Then the Doppler shift in the echo due to the motion of the searching ship is $$\Delta f = \frac{v \cos \phi}{c}(-2f) \qquad (1)$$

In the tuned circuit which determines the frequency $f$ there is a capacity C and an inductance L, which is closely subject to the relation $$f = \frac{1}{2\pi\sqrt{LC}} \qquad (2)$$

Expressed logarithmically Equation 1 becomes $$\log f = -\log (2\pi\sqrt{LC}) = -\log 2\pi\sqrt{L} - \tfrac{1}{2}\log C \qquad (3)$$

Differentiating Equation 3, we have $$\frac{\Delta f}{f} = \frac{\Delta C}{2C}, \quad \Delta f = \frac{\Delta C f}{2C} \qquad (4)$$

Substituting 4 in 1, we have $$\frac{4}{c} v \cos \phi = \frac{\Delta C}{C} \qquad (5)$$

From Equation 5 it is apparent that the capacitance C should be made to depend upon the speed $v$ of the searching ship and the cosine of the angle $\phi$ which the transducer makes when trained on the target with the course of the searching ship.

The present invention has been used in connection with standard echo ranging apparatus. The echo ranging apparatus projects a beam of supersonic sound waves under water towards a target and receives an echo back from the target. The range is obtained from the time between the sending of the signal and the receipt of the echo of the signal. The bearing is obtained from the direction in which the sound transducer (projector and receiver) is trained for receiving the optimum effect. For example, if a single beam is used the operator may sweep the target with the beam to signal extinction, first on one side of the target and then on the other, and take the average of the two bearings for the real bearing and optimum effect. If the receiver of the sound gear is of the simultaneous lobe comparison type, it is continuously trained on the target for the real bearing and more bearing information is obtained from the receiver.

There is generally a pronounced frequency change due to the motion of the searching ship and also due to the motion of the target. It is important to isolate the frequency change due to the motion of the target, in order to help in determining the target's course and the change of range between the target and the searching ship. The apparatus of the present invention, compensates for that portion of the frequency change due to the motion of the searching ship, allowing that due to motion of the target to be more readily distinguished and estimated as to magnitude.

Referring to Figure 1, element 11 is a diagrammatic representation of a transducer mounted for vertical, and horizontal angular movement in the searching ship by apparatus that is not shown. When in use the transducer is lowered in order to clear all lower portions of the ship with the sound beam. The horizontal angular movement is for purposes of obtaining a bearing on the target. Face 10 of the transducer emits the directional sound beam by the action of magnetostrictive or crystal units upon the diaphragm or face 10. These units are driven by an electrical output from switch 8.

Switch 8 has somewhat the nature of a multiplexing switch in that it alternately connects the transmitter and the receiver to the transducer, and it may perform a switching operation on the elements of the transducer at the time the receiver is connected depending upon the particular type of sound gear used.

Transmitter 12 is any standard sound gear transmitter, all of which have a capacity 12′ which determines the frequency of the emitted sound beam. The transmitter may be of the single beam type or of the simultaneous lobe comparison type.

Receiver 13 is any standard sound gear receiver which has a condenser 13′ in a frequency determining circuit. Switch 7, for this disclosure, connects the compensating apparatus 14 to the transmitter in order to compensate for the frequency change in the transmitter. It may also connect, with suitable matching apparatus, the receiver 13 to the compensating apparatus 14 in order to compensate for the frequency change in the receiver.

It is obvious that for all courses, the frequency change has a value that is proportioinal to the cosine of the angle between the target and the searching ship. Hence the bearing of transducer 11, which is trained on the target, must be translated into the compensator 14 in terms of the cosine of the angle. This is accomplished by transmitting the horizontal angular motion of transducer 11 to one of the synchro pair 15 by gear 9 fixedly attached to the transducer shaft. The movement of synchro 15 is transmitted through synchro 16 to disc 17 and stub 18, which in turn operates Scotch yoke 19, to impart movement to condenser plate 21 that is proportional to the cosine of the angle.

Since the frequency change is directly proportional to the speed, the speed is translated into the compensator 14 from speed indicator 5 by manually or automatically matching the indicator with pointer 4, which in turn imparts movement to one of a pair of synchros 23 and 24. The movement of synchro 24 is transmitted through synchro 23 to impart motion to condenser plate 22 that is proportional to the speed.

The compensator 14 comprises three sets of flat plates 20, 21, and 22. The plates 20 are stationary and are electrically connected with the plates 21. Plates 21 are mechanically connected with the yoke 19 and move horizontally therewith. The third set of plates 22 are constrained to move vertically, and according to their adjustment up or down, they overlap more or less with the plates 20 and 21, and according to the adjustment of plates 21 horizontally, they overlap more or less with the plates 22. This adjustable compensator or condenser consisting of the plates 20 and 21 on one side and the plates 22 on the other side is connected across the terminals of the condenser 12′.

It is clear that compensator 14 now has its capacity controlled so that the capacity between plates 21 and 22 is proportional to the cosine of the angle between the target and the searching ship and proportional directly to the speed of the searching ship. By paralleling the frequency determining condenser 12′ in the transmitter with the controlled condenser 14 of the compensator, it is apparent that the emitted frequency of the sound beam will be shifted an amount substantially equal to the Doppler effect produced by motion of the searching ship. By means of the switch 7 the compensator may be alternatively connected to the frequency determining condenser 13′ in the receiver, to produce the same effect. In either case, the received signals will then be free of all frequency change, except that due to the speed of the target, which change is used in some instances to help in determining the course and speed of the target.

Figure 2:
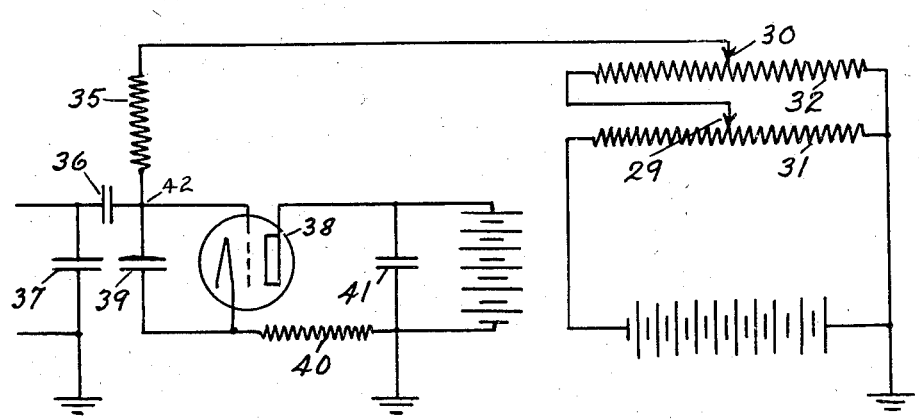
Figure 2 illustrates another form of this invention utilizing electrical means.

Figure 2 illustrates an electrical means for operating upon the condensers 12′ or 13′ in the place of the mechanical means of Figure 1. The potentiometer 32 may be adjusted for the bearing of the target in relation to the searching ship by connecting the arm 30 to the Scotch yoke 19 in order that the voltage obtained from potentiometer 32 may vary as the cosine of the angle. The potentiometer 31 may be adjusted for the speed of the searching ship by connecting arm 29 to the rack and pinion of synchro motor 23 in order that the voltage applied to potentiometer 32 from the arm 29 of potentiometer 31 may vary directly as the speed. It is obvious that if conditions warrant it the synchros 15—16 and 23—24 may be replaced by any suitable type of positive drive, such as for example, gearing.

And further, since the speed of the searching ship does not vary much during an attack, the introduction of the speed into the apparatus may be done manually by the operator. In Figure 1, plate 22 can be attached to a knob and manually adjusted. In Figure 2, the arm 29 can be attached to a knob and also manually adjusted.

This potentiometer voltage is applied through resistance 35 to the grid of tube 38. The condenser 39 has a value of the order of 50 micro-microfarads; and the resistance 40 has a value of the order of 300 ohms; and they are connected as shown in Figure 2. Condensers 36, 37 and 41 are so chosen as to value that the circuit will present a reactance that acts like that of a condenser; and the magnitude of this capacity reactance will depend on the voltage across point 42 and ground as determined by the potentiometer described above. It is clear that when this capacity equivalent circuit is placed in parallel with frequency determining condensers 12' or 13', the frequency controlling capacity can be adjusted to compensate for the Doppler effect of the searching ship.

This apparatus was tested by reconstructing the ship's speed chart from values of speed obtained from the Doppler effect. The speed chart was checked to within a tolerance of ½ knot.

I claim:

1. A method of compensating for the change of frequency due to the speed of the searching ship equipped with echo ranging apparatus comprising, training the transducer on the target, generating an electrical effect proportional to the cosine of the angle between the target and the ship's course, generating another electrical effect directly proportional to the speed of the ship, and combining the electrical effects in the frequency determining circuit of the transmitter to compensate for the change in frequency due to the speed of the ship.

2. Apparatus for compensating for the change of frequency due to the speed of the searching ship equipped with echo ranging sound gear comprising, means for generating an electrical effect proportional to the cosine of the angle between the target and the searching ship's course, means for generating an electrical effect directly proportional to the speed of the searching ship, means for applying the combined effects to the frequency determining circuit of the transmitter to compensate for the change in frequency due to the speed of the ship.

3. Apparatus for compensating for the change in frequency due to the speed of the searching ship which is equipped with echo ranging sound gear comprising, means operated by the transducer training gear for controlling a capacity in proportion to the cosine of the angle between the target and the ship's course, means operated by the ship's speed indicator to control a capacity in direct proportion to the speed of the ship, and means for influencing the frequency determining circuit of the transmitter with the combined controlled capacities in order to compensate for the change in frequency between the emitted signal and the echo signal which is due to the speed of the ship.

4. Apparatus for compensating for the change of frequency due to the speed of the searching ship equipped with echo ranging sound gear comprising, means for generating an electrical effect proportional to the cosine of the angle between the target and the searching ship's course, means for generating an electrical effect directly proportional to the speed of the searching ship, means for applying the combined effects to the frequency determining circuit of the receiver to compensate for the change in frequency due to the speed of the ship.

5. Apparatus for compensating for the change in frequency due to the speed of the searching ship which is equipped with echo ranging sound gear comprising, means operated by the transducer training gear for controlling a capacity in proportion to the cosine of the angle between the target and the ship's course, means operated by the ship's speed indicator to control a capacity in direct proportion to the speed of the ship, and means for influencing the frequency determining circuit of the receiver with the combined controlled capacities in order to compensate for the change in frequency between the emitted signal and the echo signal which is due to the speed of the ship.

OSCAR HUGO SCHUCK.

REFERENCES CITED

The following references are of record in the file of this patent:

UNITED STATES PATENTS

| Number | Name | Date |
|---|---|---|
| 1,204,826 | Schiessler | Nov. 14, 1916 |
| 1,864,638 | Chilowsky | June 28, 1932 |
| 2,134,716 | Gunn | Nov. 1, 1938 |
| 2,193,361 | Rice | Mar. 12, 1940 |